June 7, 1938. L. W. WRIGHT 2,120,196
HYDRAULIC CONTOURING ATTACHMENT FOR MACHINE TOOLS
Filed May 14, 1937 6 Sheets-Sheet 1

INVENTOR.
LEIGH W. WRIGHT
BY
AHK Parsons
ATTORNEY.

June 7, 1938. L. W. WRIGHT 2,120,196
HYDRAULIC CONTOURING ATTACHMENT FOR MACHINE TOOLS
Filed May 14, 1937 6 Sheets-Sheet 3

Fig. 6
Fig. 7
Fig. 8

INVENTOR.
LEIGH W. WRIGHT
BY
H. K. Parsons
ATTORNEY.

June 7, 1938.   L. W. WRIGHT   2,120,196
HYDRAULIC CONTOURING ATTACHMENT FOR MACHINE TOOLS
Filed May 14, 1937   6 Sheets-Sheet 4

INVENTOR.
LEIGH W. WRIGHT
BY
AHKParsons
ATTORNEY.

June 7, 1938.  L. W. WRIGHT  2,120,196
HYDRAULIC CONTOURING ATTACHMENT FOR MACHINE TOOLS
Filed May 14, 1937  6 Sheets-Sheet 6

INVENTOR.
LEIGH W. WRIGHT
BY
A. K. Parsons
ATTORNEY.

Patented June 7, 1938

2,120,196

UNITED STATES PATENT OFFICE 2,120,196

HYDRAULIC CONTOURING ATTACHMENT FOR MACHINE TOOLS

Leigh W. Wright, Norwood, Ohio, assignor to The Cincinnati Milling Machine Company, Cincinnati, Ohio, a corporation of Ohio Application May 14, 1937, Serial No. 142,661

32 Claims. (Cl. 90—13.5)

This invention relates to machine tools and more particularly to improved means for rendering a standard type of machine tool utilizable for automatically performing contouring operations of either two or three dimensional proportions.

The conventional form of machine tool is usually only capable of performing a rectilinear feeding movement between the tool and work, whereby an element of the machined surface, taken in the direction of feed becomes a straight line.

One of the objects of this invention is to provide auxiliary control means in the nature of an attachment whereby deviation from this straight line movement may be effected automatically so that surfaces of undulating contours may be copied from a pattern.

Another object of this invention is to increase the usefulness of a conventional machine tool by providing a comparatively inexpensive control mechanism which may be easily and quickly attached to the machine for rendering the same capable of performing profiling and die-sinking operations.

A further object of this invention is to provide a portable unit having three motors, each of which is adapted to perform a distinct function and which are readily connectible to the proper operating lead screws of the machine in accordance with the functions assigned to the motors; and a tracer controlled circuit for automatically controlling the operation of said motors.

An additional object of this invention is to provide an improved portable hydraulic unit for transforming a plain machine tool into an automatic pattern controlled machine tool.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts.

Figure 1:
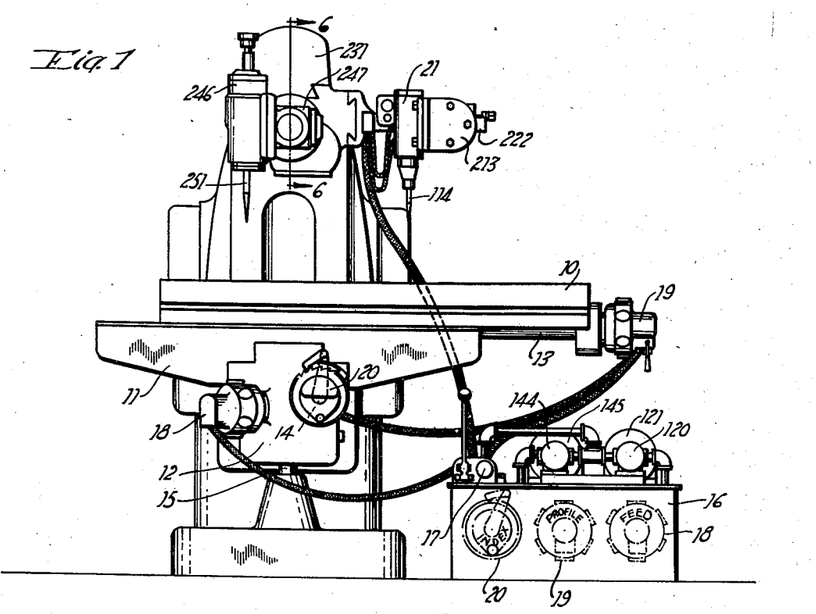
Figure 1 is an elevation of a machine tool showing the mechanism of this invention applied thereto for control thereof.

This invention has been exemplified in connection with a milling machine because such machines have means for supporting a work piece for three directional movement with respect to a cutting tool, although it will be understood that the invention is applicable to other types of machines having two directional movement. A conventional milling machine, such as shown in Figure 1, has a work table 10 which is movable along a first path, a saddle 11 which is movable along a second path at right angles to the first named path, and a knee 12 which is movable at right angles to the plane determined by the first two named paths. These three slides are moved by conventional mechanical means, such as lead screws 13, 14 and 15 respectively. These lead screws are provided with manually operable control levers which are usually removable. By means of this invention, hydraulic motors may be substituted for these manually operable levers and, with the assistance of a tracer control unit which may be detachably mounted in cooperative relation to the work table and tool spindle, various types of contouring operations may be performed by the machine.

Briefly, this invention consists of a portable unit, indicated generally by the reference numeral 16 in Figure 1, containing the necessary elements for putting oil or other suitable operating fluid under pressure. The unit carries a secondary valve 17 which controls the distribution of this pressure fluid among hydraulic motors 18, 19 and 20. These motors are mounted, when not in use, on placement pads formed on the side of the unit, and when it is desired to utilize the same, they are removed and detachably connected to the proper lead screws of the machine. A tracer unit 21 is also provided with the unit for controlling the position of the secondary valve which determines distribution of fluid to the motors in such a manner that a cutting path will be produced having an outline corresponding to the outline of a pattern carried by the table.

Attention is invited to the fact that the motors as well as the tracer unit are hydraulically connected to the secondary valve at all times, so that it is not necessary for the operator to make any pipe connections in order to utilize this invention.

An undulating cutting path which is necessary for successful performance of profiling and die-sinking operations may be said to be the resultant of motions along two rectangular paths arranged at right angles to one another. One of these paths will be known herein as the "feed" path, because it is to indicate the general direction of the feeding movement between the cutter and work, and the other will be known herein as the "profiling" path because it is along this path that deviations are caused to occur and which combine to form the resultant undulating path.

In die-sinking operations, it is the usual practice, after one cutting stroke has been executed, to effect an indexing movement at right angles to the plane of the cutting path, and it is desirable that this function be performed automatically at the time of reversal in order that the entire operation may be carried out without interruption.

It is obvious from the foregoing that if individual motors having specific functions are utilized, that each must be connected in a definite manner to the hydraulic control circuit. In order to obviate the necessity of an operator making any pipe connections, with the great possibility of error, the function of each hydraulic motor is indicated thereon, and each motor is permanently connected to the hydraulic control circuit in the proper manner for carrying out the function assigned thereto. For instance, the motor 18 is indicated in Figure 1 as the "feed" motor, the motor 19 as the "profiling" motor, and the motor 20 as the "index" motor. These motors are, however, interchangeably connectible to any one of the three lead screws of the machine so that the operator merely has to determine which lead screw is to perform the feeding function and attach the "feed" motor thereto. He then determines which lead screw is to perform the profiling function and attaches the "profiling" motor thereto. If the operation is to be a die-sinking operation, he then attaches the "index" motor to the remaining lead screw.

The tracer head has its control valve properly connected by flexible leads for controlling the position of the secondary valve, and it is only necessary for the operator to attach the tracer head to the structure of the machine in such relation to the cutter spindle and work table thereof that the tracer may follow the pattern.

Figure 2:
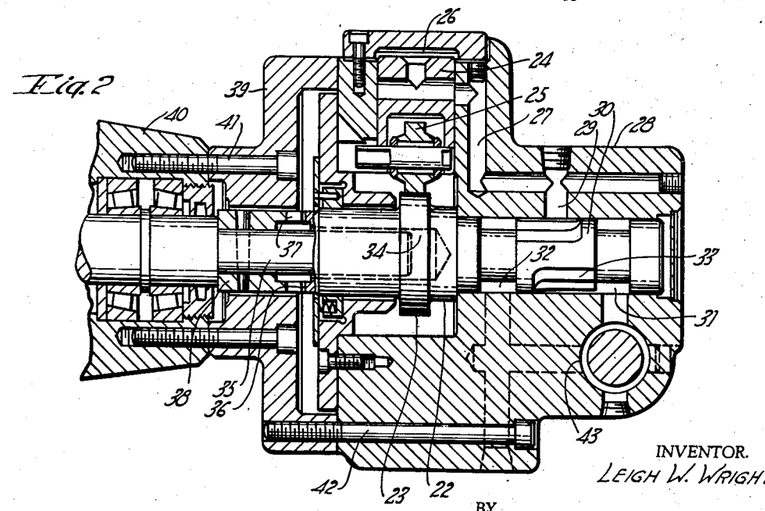
Figure 2 is a section through one of the hydraulic motors showing the method of detachable connection to a machine tool lead screw.

The "feed" and "profiling" motors may be of the same construction and may be of any conventional form of hydraulic motor, preferably of the rotary type. One form of such motor is shown in Figure 2 of the drawings, and comprises mainly an operating shaft 22 upon which is integrally formed an eccentric cam 23 which is acted upon by a plurality of radially arranged pistons 24 having anti-friction rollers 25 mounted in the end thereof for engagement with the periphery of the cam. Each cylinder 26 is connected by an internal passage 27 formed in the motor housing 28 to a port 29 adjacent the periphery of a distributor valve 30 rotatable with the shaft 22. Adjacent opposite ends of the distributor valve there is formed a pressure groove 31 and an exhaust groove 32. And by means of overlapping longitudinal grooves 33 formed in the periphery of the distributor valve and alternately terminating in the pressure and exhaust grooves, the cylinders 26 will be alternately connected to pressure and exhaust.

The motor shaft 22 has an axial bore 34 formed in one end thereof for receiving the projecting end 35 of a machine lead screw. Adjacent the periphery of this bore are clutch teeth 36, which are adapted to interengage the clutch teeth 37 formed on the sleeve 38, which is integral with the lead screw and constitutes part of the machine. A suitable mounting bracket 39 may be secured to the end of the lead screw housing 40, as by bolts 41, and the motor attached to this bracket by means of screws 42 passing through the motor frame.

Figure 15:
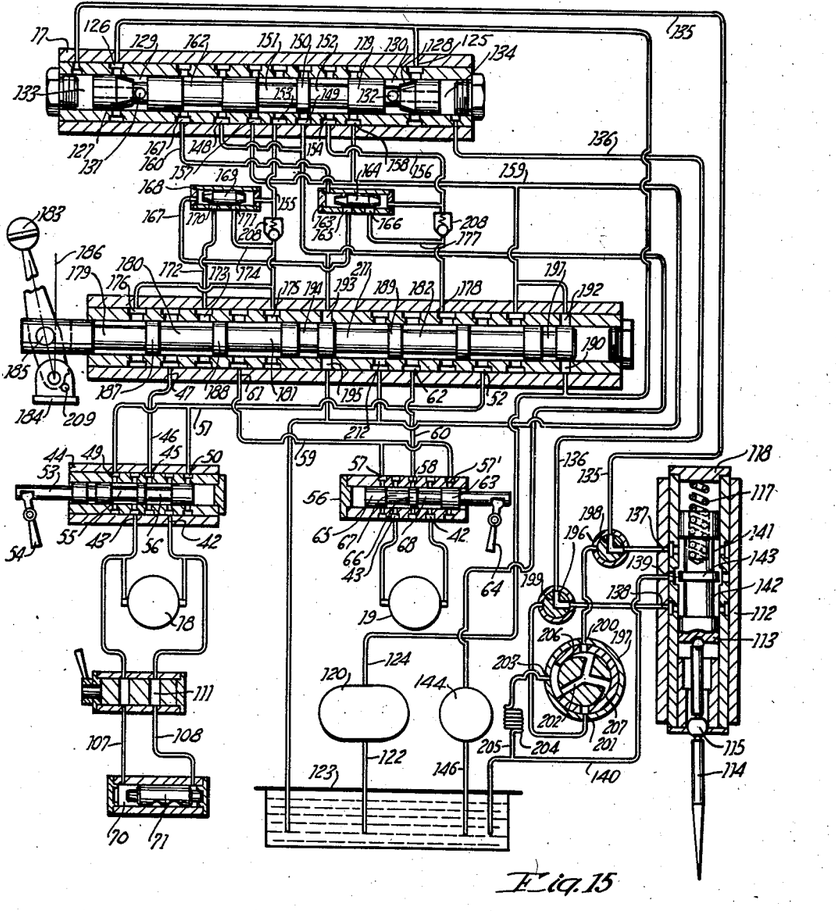
Figure 15 is a diagrammatic view of the hydraulic control circuit of this invention.

Both the "feed" motor and the "profile" motor have a reversing valve slidably mounted in the motor housing, and the grooves 31 and 32 are connected respectively to ports 42 and 43 of this valve. As shown in Figure 15, the "feed" motor control valve housing 44 has a pressure port 45 which is connected by channel 46 to port 47 of a start and stop control valve 48 which is mounted on the control unit. It also has a pair of ports 49 and 50 which are interconnected to a return channel 51 terminating in port 52 of valve 48. The valve plunger 53, which is shiftable by the manually operable handle 54, has a pair of grooves 55 and 56, whereby pressure port 45 may be selectively connected to either port 42 or 43 for reversible operation of the "feed" motor, while the remaining port is connected to one of the exhaust ports 49, 50.

The control valve housing 56 for the "profile" motor has a pair of ports 57 and 58, which are connected by flexible channels 59 and 60, respectively, to ports 61 and 62 of the start and stop control valve 48. The valve 56 has a plunger 63 which is shiftable by a manually operable handle 64. It will be noted that in the stop position a pair of spools 65 and 66 formed on the valve plunger are in a position to block ports 57 and 58, but when the plunger is shifted to the left as viewed in Figure 15, a pair of annular grooves 67 and 68 serve to interconnect port 57 with 43, and port 58 with 42; and when shifted to the right, the grooves interconnect port 58 to port 43 and port 57 to port 42.

Figures 3, 4, 5:
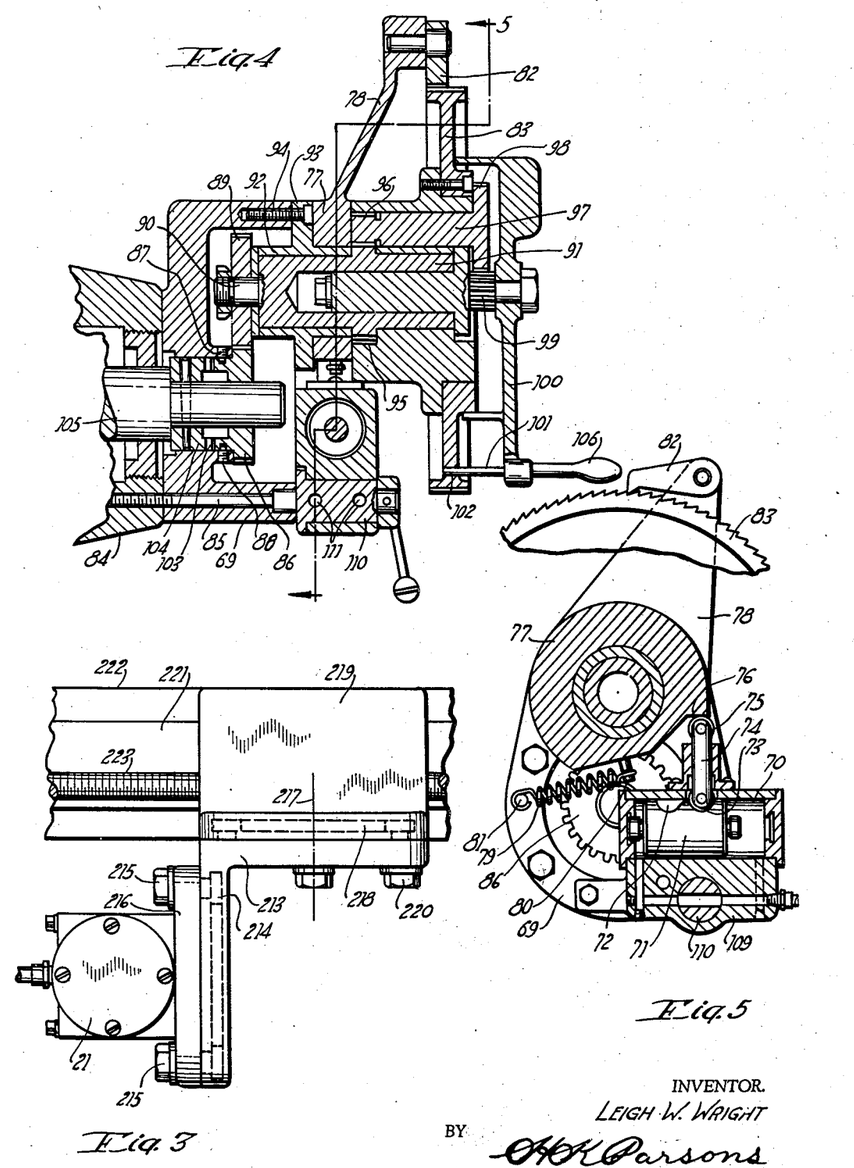
Figure 3 is a detail plan view showing the method of supporting the tracer unit on its supporting bracket for adjustment in two different planes.
Figure 4 is a detail section through the indexing motor showing the method of detachably connecting the same to a machine tool lead screw.
Figure 5 is a detail section on line 5—5 of Figure 4.

The "indexing" motor 20 is different in construction from the other two motors and the details thereof are more specifically shown in Figures 4 and 5. This motor comprises a housing 69 in which is formed a cylinder 70 having a contained piston 71.

As shown in Figure 5, the piston 71 has two arcuate notches 72 and 73 axially spaced on the periphery thereof, whereby a plunger 74 supported for reciprocation in a radial direction with respect to the axis of the piston 71 will execute one reciprocation for each stroke of the piston. The plunger 74 has rollers 75 rotatably mounted at each end thereof, one of which engages the notches in the piston, and the other of which engages a shoulder 76 which is cut in the periphery of the hub 77 of indexing lever 78. A spring 79 has one end attached to a pin 80 carried by the hub 77 and the other end to a pin 81 carried by the casing to urge the lever 78 normally in a clockwise direction as viewed in Figure 5. The free end of the lever 78 carries a pawl 82 which engages the notched periphery of the index wheel 83.

When pressure is admitted to either end of cylinder 70, the piston 71 immediately moves to the other end, thereby causing a reciprocation of plunger 74 which, during the outward movement, will rotate the index lever in a counterclockwise direction, causing movement of wheel 83, after which the spring 79 will return the parts to the position shown.

The housing 69 is secured to the machine frame 84 as by bolts 85. This housing carries a gear 86 which is held in position by means of pins 87 riding in an annular groove 88 formed on the hub of the gear. The gear 86 intermeshes with a gear 89 which is keyed to the reduced end 90 of a shaft 91. This shaft is held in a bearing 92 forming part of a member 93 which is secured to the frame 69 by bolts 94. The member 91 has gear teeth 95 cut in the periphery of an annular rib formed thereon for interengagement with a pinion 96 formed on the end of shaft 97 which shaft has a gear 98 integral with its other end and intermeshing with a pinion 99 supported for free rotation relative to the member 91. The pinion 99 is keyed for rotation with a manually operable handle 100 which carries a pin 101 adapted to engage any one of a series of holes 102 formed in the index wheel 83.

The gear 86 has clutch teeth 103 formed on one face thereof for interengagement upon assembly with similar formed clutch teeth formed on the member 104 which is a part of the machine and integrally secured to the end of a machine lead screw 105.

For manually indexing the lead screw small amounts, the pin 101 is withdrawn from the holes 102 by pulling on the handle 106 and then rotating the lever 100 the prescribed amount.

For automatic operation, the opposite ends of cylinder 70 are connected by channels 107 and 108 to ports 42 and 43 of the reversing valve 44 of the "feed" motor.

Since there are times when the "index" motor will not be utilized or even mounted on the machine, means have been provided for cutting out the "index" motor regardless of whether it is mounted on the machine or on its placement pad on the unit, and without the necessity of the operator connecting or disconnecting any pipes. This means comprises a valve 109, associated with the motor having a rotatable valve plunger 110 in which two cross bores 111 are drilled. When the plunger is in the position shown in Figures 5 and 15, the lines 107 and 108 are connected to the ports 42 and 43 whereby upon each reversal of the "feed" motor the piston 71 executes one stroke and thereby a predetermined amount of indexing of the machine lead screw to which it is attached. Upon rotation of the plunger 110 through an angle of 90°, the "index" motor is disconnected from the "feed" motor supply ports and thereby rendered inoperative. It will be obvious, however, that if the motor is attached to the machine, the "indexing" mechanism may still be manually actuated as for set-up purposes.

An automatic tracer controlled mechanism has been provided comprising a tracer head 112 in which is slidably mounted a valve plunger 113. A tracer 114 has an integral ball-shaped portion 115 intermediate of its length by which it is supported for universal movement in the tracer head. A ball 116 is interposed between a depression formed in the upper end of the tracer arm, and a similar depression formed in the lower end of the valve plunger, whereby upon deflection of the tracer arm from a central vertical position, the valve plunger 113 will be caused to move upward. A spring 117 is interposed between the upper end of the valve plunger 113 and the cap 118 of the tracer head for exerting a continuous downward urge on the plunger 113, which reacts through the ball 116 and tends to centralize the tracer arm 114 in a vertical position.

The tracer valve serves through hydraulic amplification means to control the position of a secondary valve plunger 119 which is slidably mounted in a housing 17. This is accomplished in the following manner. A pump 120, mounted on top of the unit 16 and driven by an electric motor 121, has an intake 122 through which fluid is withdrawn from a reservoir 123 contained in the unit 16 and delivered to channel 124 which has two branches terminating in ports 125 and 126 of the secondary valve. The valve plunger 119 has tapered spools 127 and 128 movable relative to ports 125 and 126 for varying the hydraulic resistances of these ports. The annular grooves 129 and 130, adjacent the ends of the tapered spools, are connected by interdrilling 131 and 132 respectively to chambers 133 and 134 formed in the end of the valve housing. These chambers are connected by channels 135 and 136 to ports 137 and 138 of the tracer controlled valve. A third port 139, intermediate ports 137 and 138, is connected by channel 140 to reservoir.

The valve plunger 113 has a pair of annular grooves 141 and 142 formed therein and separated by an intermediate spool 143. This spool is movable relative to port 139 which port is slightly wider than the width of spool 143, whereby when the spool 143 is centrally located with respect to port 139, the resistance to flow of fluid from ports 137 and 138 to reservoir is equal, which would thereby normally cause equal pressure in channels 135 and 136. If this pressure is not equal, then the pressure in chambers 133 and 134 will not be equal and since the valve plunger 119 is always free to move, it will shift in such direction as to cause equalization of these pressures. This is based on the proposition that when the values of two serially connected resistances are equal, the pressure in the passage connecting the two resistances is equal to one-half of the incoming pressure.

Since the incoming pressure at ports 125 and 126 is always equal because they are both connected to pump 120, it will be apparent that when the value of the resistance created by the spool 127 at port 125 is equal to the value of the resistance to flow from port 137 to reservoir, that the pressure in channel 135 will be equal to one-half the incoming pressure; and if the value of the other resistances at port 126 and to the escape of fluid from port 138 to reservoir are equal, then the pressure in line 136 will be equal to one-half the incoming pressure, and therefore equal to the pressure in line 135, whereby the opposing pressures acting on the end of plunger 119 will be equal and the same will remain stationary.

If now the tracer valve plunger 113 moves downward from its central position as viewed in Figure 15, the resistance to flow from 138 to reservoir will increase and the resistance to flow from 137 will decrease, thereby causing a rise in pressure in line 136 and a fall in pressure in line 135. This will cause a pressure differential on the ends of plunger 119 causing the same to shift to the left as viewed in Figure 15 due to the higher pressure in channel 136, which will increase the resistance at port 126 and decrease the resistance at port 125. The result is an increase in the pressure drop at port 126 and a decrease in the pressure drop at port 125, which tends toward equalization of pressure in chambers 133 and 134, and the movement of valve plunger 119 will continue until this equalization has been brought about.

Thus the secondary valve is caused through remote control to take up various positions in accordance with the position of the tracer controlled valve. The secondary valve controls the proportional rates of rotation of the "feed" and "profile" motors in the following manner. A variable delivery pump 144 mounted on the unit 16, and driven by an electric motor 145, provides the pressure fluid for operating these motors, and has an intake 146, through which fluid is withdrawn from the reservoir 123; and a delivery pipe 147 which terminates in pressure ports 148 and 149 in the secondary valve. The secondary valve plunger has an annular spool 150, and annular grooves 151 and 152 on opposite sides thereof. This portion of the valve serves to control reversible operation of the "profile" motor, and to this end the valve is provided with ports 153 and 154 to which are connected channels 155 and 156 which eventually lead to the "profile" motor. Additionally, the secondary valve has a pair of exhaust ports 157 and 158 which are connected to a return line 159.

When the secondary valve plunger 119 is in a central or neutral position, the spool 150 closes the pressure port 149 and no fluid is flowing at this time to the "profile" motor. This means that the tracer 114 is sufficiently deflected to hold the tracer controlled valve plunger 113 in its central or neutral position. It will now be apparent that if the pattern causes a greater deflection of the tracer or permits a lesser deflection of the tracer, that the secondary valve plunger will shift either to the right or to the left of the position in which it is shown. In this case pressure fluid will be delivered either to channel 155 or channel 156 and cause rotation of the "profile" motor in a clockwise or counterclockwise direction.

A single channel 160 supplies fluid pressure to the "feed" motor, and this channel is connected to port 161 of the secondary valve, whereby a groove 162 formed in the valve plunger will connect port 148 to port 161 when the plunger 119 is in its neutral position. It will be noted that the annular groove 162 is of such length that when the plunger 119 is in its central position, ports 161 and 148 will each be half closed. This means that when the plunger 119 is shifted either to the right or to the left, the quantity of fluid delivered to channel 160 will be reduced. In other words, when the plunger 119 is in a central position, all of the delivery from pump 144 will go into the feed line 160 and thereby to the motor 18 to cause actuation thereof at a prescribed maximum rate.

When the tracer controlled valve departs from its central position in either direction, the quantity of fluid delivered to channel 160 will be reduced and the remainder of the flow will then be delivered to either channel 155 or 156. Thus the secondary valve divides the flow from pump 144 between the "feed" and "profile" motors to produce an undulating cutting path.

It is necessary, however, in order to maintain proportional division of flow as set up by the secondary valve to provide a pair of balancing valves. To this end the feed channel 160 is connected to one end of balancing valve 163, and the other end of the valve is connected to channel 156. This valve has a plunger 164 which has tapered ends which are movable relative to ports 165 and 166 to control the pressure in lines 160 and 156. It will be noted that when the plunger 164 is in a central position that ports 165 and 166 are each halfway open.

Since either line 155 or 156 may be under pressure, it is necessary to connect the feed line to a second balancing valve so as to balance the flow therein against the line 155 when the same is under pressure. To this end the port 165 is connected by channel 167 to the end of balancing valve 168 and the other end of this balancing valve is connected to line 155. This valve has a plunger 169 with tapered ends which is movable to control the flow through ports 170 and 171. Port 170 is connected by channel 172 to port 173, and port 171 is connected by channel 174 to ports 175 and 176, and port 166 is connected by channel 177 to port 178, all of these last named ports being in the start and stop valve 48. When the start and stop valve plunger 179 is in the running position in which it is shown in Figure 15, port 173 is connected by annular groove 180 to port 47 which leads to the "feed" motor; port 175 is connected by annular groove 181 to port 61 which leads to one side of the "profile" motor; and port 178 is connected by annular groove 182 to port 62 which leads to the other side of the "profile" motor.

The use of balancing valves to maintain the division of flow among two or more hydraulic motors does not constitute part of the present invention, the same having been disclosed in U. S. Patent No. 1,999,834 issued April 30, 1935, to which reference may be had for the theory of operation thereof.

The valve plunger 179 is shifted by a control lever 183 which is pivotally supported in a bracket 184 mounted on top of the unit 16 and has a connection at 185 to the plunger 179. The lever is shiftable clockwise to a stop position indicated by the dash and dot line 186 in which position the spool 187 will close port 47, the spool 188 will close port 61, and the spool 189 will close port 162. Thus the three motor ports are disconnected from the secondary valve.

In order to prevent high pressures building up in the pump delivery lines, means have been provided for connecting these pumps to reservoir when the valve is in the stop position. To this end the delivery channel 124 of pump 120 has a branch connection to port 192. The delivery channel 147 of pump 144 has a branch connection to port 193 which is connected by annular groove 194 to reservoir port 195.

In the operation of the machine, the stop valve plunger 179 is set in a stop position, and the pumps are started by energizing the electric motors 121 and 145. At this time the tracer is not in contact with the pattern and is therefore undeflected, which means that the spool 143 on the tracer valve is on the lower side of port 139 as viewed in Figure 15, which would thereby raise the pressure in line 136 and lower the pressure in line 135, thereby shifting the secondary valve to its extreme left hand position. This means that the pump 144 is connected to one of the supply lines for the "profile" motor 19.

Figure 16:
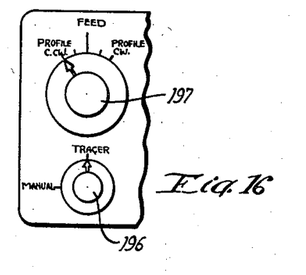
Figure 16 is a detail view of the controls on the tracer unit.

If the stop valve is now thrown to a running position the "profile" motor will rotate the machine lead screw to which it is attached in one direction thereby causing one direction of movement of the pattern support. It may be desirable, however, for set-up purposes to move this support in an opposite direction or to move the support which is actuated by the lead screw attached to the "feed" motor. To this end, means have been provided for controlling the position of the secondary valve independently of the tracer so that the secondary valve may be selectively positioned to supply fluid pressure to the motors severally. This means comprises a rotatable selector valve 196 which is interposed in the channels 135 and 136 leading to the tracer controlled valve, whereby the channels 135 and 136 may be disconnected from the tracer valve and connected to a manually controlled valve 197 which is movable through various positions to effect different positions of the secondary valve. In other words, the valve plunger 196 has a pair of L-shaped passages 198 and 199 which, in the position shown, serve to connect channels 135 and 136 to ports 137 and 138 respectively of the tracer controlled valve. When the plunger 196 is rotated counter-clockwise through an angle of 90° as shown in Figure 16 the channels 135 and 136 are then connected through branch lines to ports 200 and 201 of the manual controlled valve 197. This valve has a Y-shaped passage 202 for simultaneously connecting ports 200 and 201 to an exhaust port 203 leading to reservoir. In order to insure a sufficient rise in pressure in channels 135 and 136 to cause shifting of the secondary valve to its central position, if it is not in that position, a suitable hydraulic resistance 204, which may be in the form of a coil of small bore copper tubing, is inserted in the reservoir line 205. If the resistances at ports 200 and 201 are equal, the secondary valve plunger 119 will shift to a central position in order to make the hydraulic resistance created by the spools 127 and 128 equal. In this position of the secondary valve, it will be noted that the spool 150 will disconnect the pump 144 from the "profile" motor and permit all the flow to go to the "feed" motor. By proper manipulation of the "feed" motor reversing valve plunger 53, the slide operated by the "feed" motor may be adjusted in either direction for set-up purposes.

The valve 197 may be rotatably positioned to connect port 200 through resistance 206 to reservoir and close port 201 whereby the higher pressure in channel 136 will shift the secondary valve plunger to its left hand extreme position; and rotation of the valve 197 clockwise will serve to connect port 201 through resistance 207 to reservoir and close port 200 thereby causing a rise in pressure in channel 135 which will shift the secondary valve to its extreme right position. This makes it possible to disconnect the pump 144 from the feed line and selectively connect it to either one of the "profie" motor supply channels. With the reversing valve plunger 63 in a central position, it is possible to manipulate the "profile" motor to cause adjustment of the connected slide or to feed the work and pattern up to the cutter and tracer for machining operations.

It is possible by means of these manipulations to establish contact between the tracer and pattern, after which the stop valve may be moved to its stop position and the reversing valves 53 and 63 properly positioned in accordance with the desired direction of feed and profiling. After setting the selector valve 196 in a position to connect the channels 135 and 136 to the tracer, the stop valve is shifted to its running position, whereby the contouring operation will automatically begin.

It will be obvious that when the secondary valve is in a position to deliver fluid pressure to channel 155, that channel 156 will be connected to reservoir and therefore have a very low pressure therein. This means that the balancing valve plunger 164, for instance, will shift to its extreme right hand position, practically closing port 166 which would thereby stop the return flow. To eliminate this condition and permit substantially free passage of fluid to reservoir through either channel 155 or 156, as the case may be, check valves 208 are connected in parallel with one end of the balancing valves so that the check valves will open during the return flow, but will close under a pressure flow in the opposite direction. This makes it possible for either balancing valve to be effective for balancing purposes without interfering with the return flow through the other channel.

In profiling operations such as following around the periphery of a rectangular shaped pattern, it may be desirable to change the general feeding direction, or in other words reverse the functions of the "feed" and "profile" motors. This may be instantly accomplished by pulling the stop pin 209 which will permit the stop lever 183 to be thrown past its stop position to a third position, which will then connect the feed port 161 of the secondary valve to the "profile" motor and connect the ports 153 and 154 to the "feed" motor. In other words, when the stop plunger 179 is shifted to its extreme right hand position, port 176, which is the terminus of line 155, is connected by annular groove 210 to port 47 of the "feed" motor and port 178, which is the terminus of line 156, is connected by annular groove 182 to port 52 of the "feed" motor, whereby the latter is now reversibly controlled by the reversing portion of the secondary valve. The feed line 166, which terminates at port 173, is connected by annular groove 180 to port 61 of the "profile" motor which will thereby cause rotation of the "profile" motor in one direction determined by the position of the reversing valve 62. The channel 160 is now a return channel and port 62 is connected by annular groove 211 to exhaust port 212.

In order to obtain the greatest benefits from this invention and increase its universality of application to varying conditions, the tracer unit 21 is mounted on an angular bracket 213, as more particularly shown in Figure 3, and one leg of this bracket is provided with a circular T-slot 214 in which are mounted T-bolts 215 which are adapted to pass through holes in the mounting pad 216 integral with the tracer unit, whereby the tracer unit may be clamped in various angular positions lying in a plane parallel to this leg of the bracket. In addition, the bracket itself is movable about a center indicated by the dash and dot line 217 which is the center of a second circular T-slot 218 formed on one face of a supporting slide 219. Clamping bolts 220 mounted in this T-slot and passing through the other leg of the bracket 213 serve to clamp this bracket in various angular positions about the center 217 and thereby to secure the tracer unit in various angular positions in a second plane perpendicular to its first plane of angular adjustment. The slide 219 is mounted upon a dove-tailed guideway 221 formed on the main supporting bracket 222 which has suitable means at one end for attachment to the machine. For ease of adjustment, a manually operable screw 223 is carried by the bracket 222 and threaded through a nut carried by the slide 219 whereby upon rotation of the screw the slide and thereby the tracer head may be variably positioned therealong in various spaced relation with respect to the cutter.

Figures 12, 13:
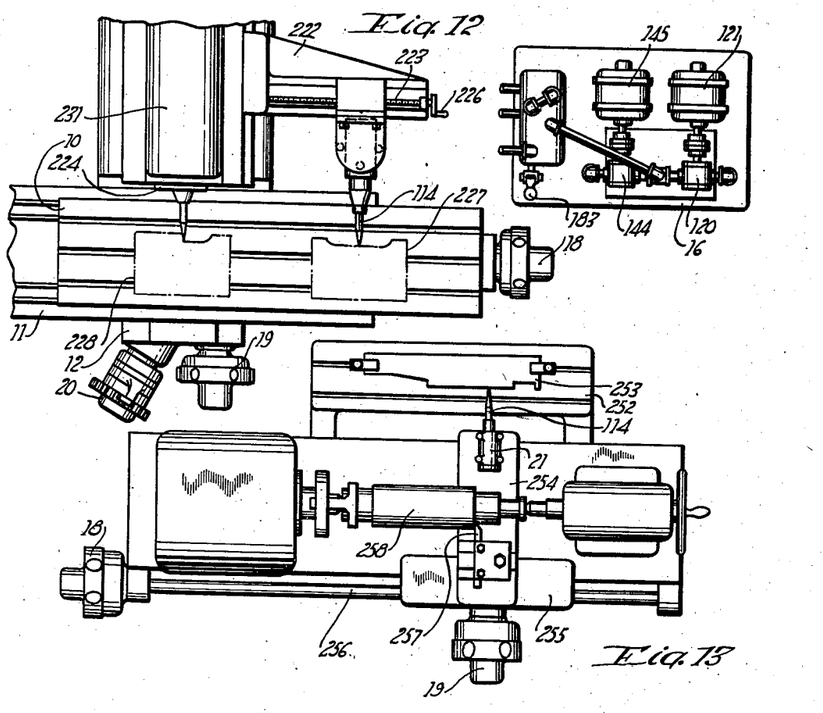
Figure 12 is a plan view showing the manner of supporting the tracer on a conventional horizontal spindle milling machine.
Figure 13 is a plan view showing this invention applied to the control of a lathe.

In Figure 12, this invention is shown applied to a conventional horizontal spindle knee and column type milling machine. In this figure the reference numeral 224 indicates the spindle of the machine to which a profiling or engraving tool 225 is attached for rotation thereby. In this case the bracket 222 which supports the tracer unit is attached to the side of the machine and by rotation of the lead screw 223 by means of the handle 226, the tracer 114 may be spaced with respect to the cutter 225 in the same relation that the pattern 227 is spaced from the work piece 228. It will be apparent that by attaching the "feed" motor 18 to the lead screw of the table 10, and the "profiling" motor 19 to the lead screw of the saddle 11 that an undulating profile, such as 228, on the pattern, may be reproduced on the work automatically.

If the face of the pattern is sufficiently wide to require more than one cut it is apparent at the end of one stroke of the table that the operator can throw the reversing valve 54 for the "feed" motor so that a cutting stroke in the return direction may be effected. By attaching the "index" motor 20 to the elevating screw for the knee, the table 10 may be indexed vertically and automatically each time the reversing valve 52 is shifted from one extreme position to the other.

Figures 6, 7, 8:
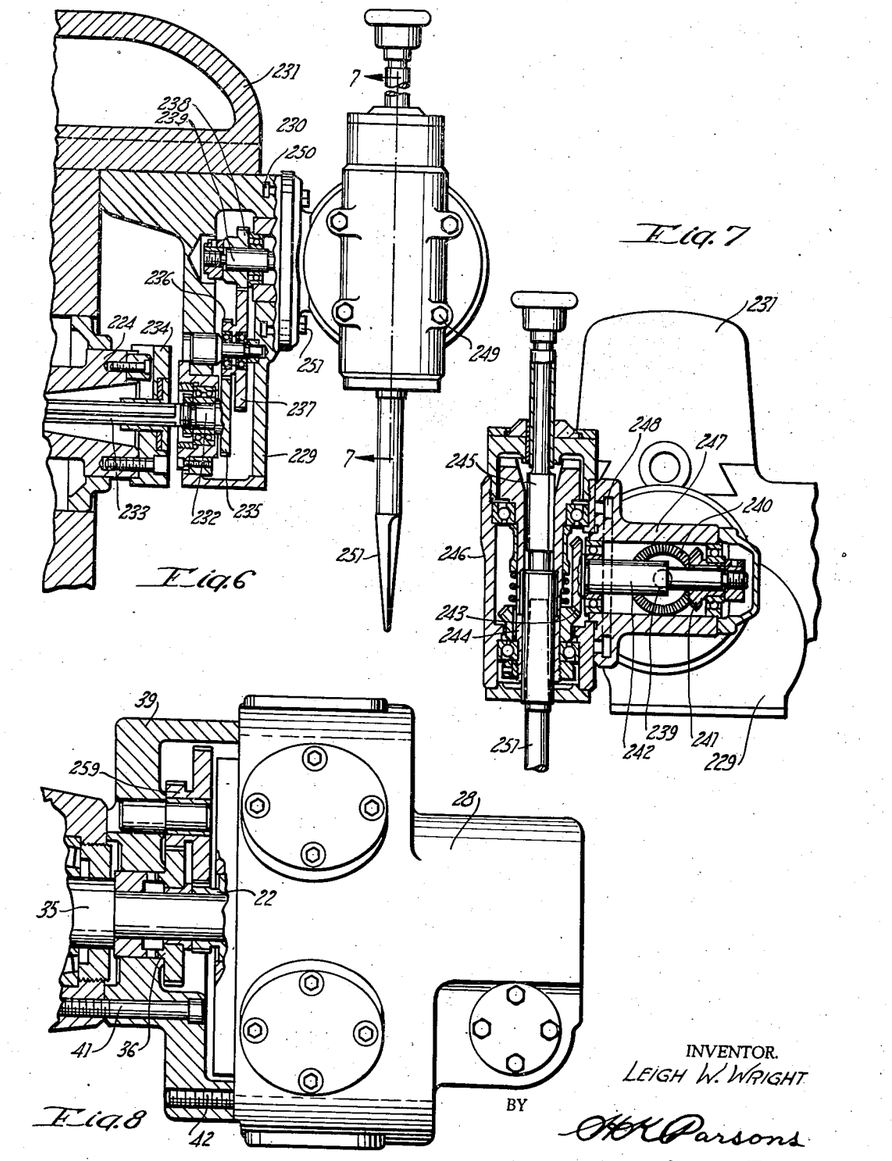
Figure 6 is a section on the line 6—6 of Figure 1.
Figure 7 is a detail section on the line 7—7 of Figure 6.
Figure 8 is a detail view showing the manner of incorporating a reduction drive in one of the hydraulic motors.

It is desirable, however, in performing operations of this nature that the operator may readily view the work during the cutting operation, which is not so easy with the set-up shown in Figure 12, and therefore it would be more desirable from a practical standpoint to use some form of attachment such as that shown in Figures 6 and 7 whereby the cutter spindle may be arranged in a more desirable relation with respect to the work and the operator. This attachment comprises a housing 229 having guideways 230 by which it may be attached to an overarm 231 carried by the machine. A shaft 232 is antifrictionally journaled in the housing and has a splined extension 233 whereby it may be operatively connected with the cutter spindle 224 for rotation thereby. In practice a plate 234 is bolted to the end of the spindle nose, the plate having a splined bore through which the splined end 233 of the shaft 232 passes, which arrangement permits the housing 229 to be adjusted along the overarm without breaking the driving connection with the spindle.

The shaft 232 has a gear 235 secured to the end thereof in operative driving relation to a pinion 236 which is also antifrictionally supported in the housing. Integral with the pinion 236 is a gear 237 meshing with gear 238. This gear is keyed to the end of shaft 239 which shaft, as shown in Figure 7, terminates in a bevel gear 240. This bevel gear meshes with a similar bevel gear 241 keyed to the end of a cross shaft 242. This shaft in turn is connected by bevel gearing 243 for driving a sleeve 244 in which is splined the cutter spindle 245. The sleeve 244 is antifrictionally journaled in a housing 246 which is angularly adjustable about the center of shaft 242 and with respect to its supporting bracket 247. A circular T-slot 248 serves to carry T-bolts 249 by which the spindle is clamped in various angular positions.

The bracket 247 in turn is angularly adjustable about the center of shaft 239 and with respect to the housing 229. To this end another circular T-slot 250 is formed in the housing 229 and by means of T-bolts 251 passing through the bracket 247, the cutter spindle may be adjusted angularly in a second plane at right angles to its first plane of adjustment.

The end of the cutter spindle 245 has a conventional tapered socket in which various cutting tools 251 may be secured. It will be noted that the cutter spindle is angularly adjustable in two planes in a similar manner to the adjustment of the tracer.

Figure 9:
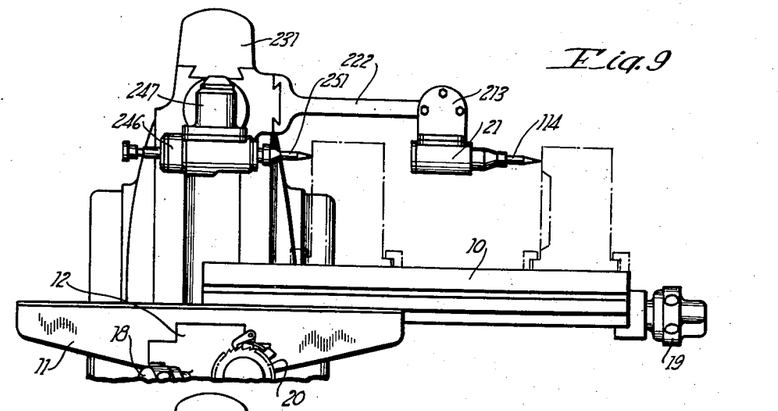
Figures 9, 10 and 11 are views showing different ways of utilizing the invention in connection with a milling machine.
Figure 10:
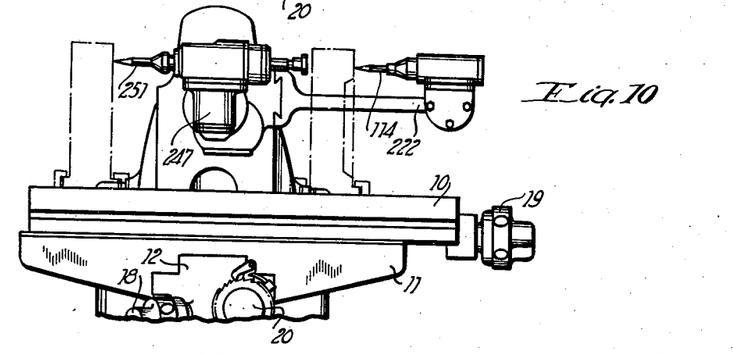
Figure 11:
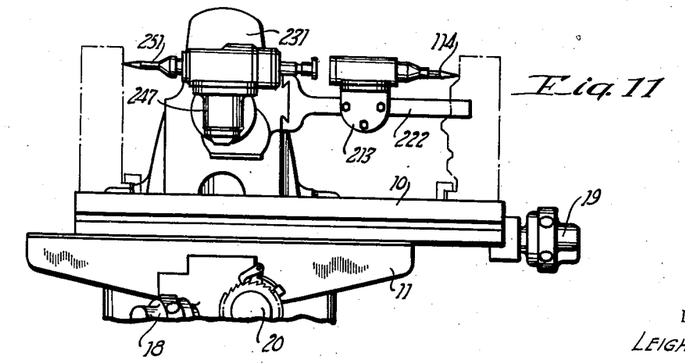

The advantage of using a universal cutter spindle support, such as shown in Figures 6 and 7, is brought out in Figures 9, 10 and 11 of the drawings. In Figure 9 the cutter spindle 251 and tracer 114 are adjusted to a horizontal position whereby die-sinking operations may be performed with the "profiling" motor 19 attached to the table lead screw for controlling the profiling movement and the feeding movement may be effected either in a vertical direction by attaching the "feed" motor 18 to the knee elevating screw or in a horizontal direction by attaching the "feed" motor to the saddle lead screw. In either case the operator may easily watch the cutting operation and by attaching the "index" motor to the proper lead screw, he only has to operate the reversing valve 53 at the end of each cutting stroke, the reversing valve being associated with the "feed" motor and being easily accessible from a position in which he can clearly watch the cutting operation.

In Figure 10, the parts are shown in the opposite position. In Figure 11 there is shown a set-up whereby male parts may be cut from female parts, or vice versa, and in this case, the cutter 251 and the tracer 114 are supported in such a manner that they point in opposite directions. Again the "profiling" motor 19 may be attached to the table lead screw and the "feed" motor attached to the knee elevating screw and the "index" motor 20 attached to the saddle lead screw.

Figure 14:
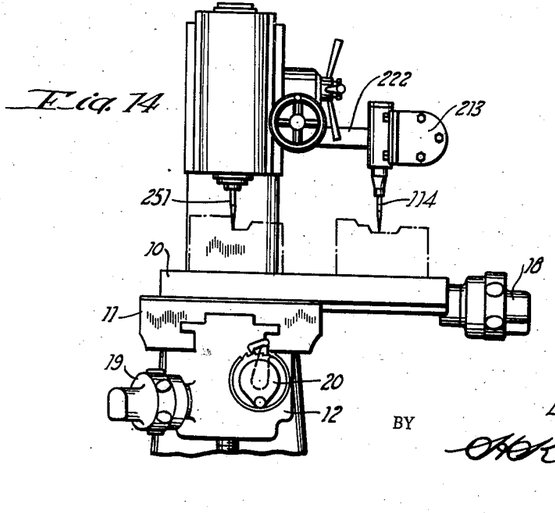
Figure 14 is a view in elevation showing this invention applied to a vertical spindle milling machine.

In Figure 14, the invention is shown adapted to a vertical spindle milling machine for performing a die-sinking operation in which case the "feed" motor 18 may be attached to the table lead screw and the "profiling" motor 19 attached to the knee elevating screw with the indexing function being performed by the "index" motor 20 attached to the saddle lead screw.

In Figure 13, the application of the invention to other types of machine tools besides milling machines is illustrated, in this case the machine tool being a lathe. For reproducing purposes, the lathe may be provided with a bracket 252 for supporting a pattern 253 in operative relation to the tracer unit 21 which may be mounted on the cross slide 254 of the lathe. As is usual in such machines, the cross slide 254 has a manually operable screw to the end of which the "profiling" motor 19 may be attached. The cross slide 264 is usually mounted on a notch 255 traversed by a lead screw 256 and in this case, the "feed" motor 18 may be attached to the end of this screw whereby a lathe tool 257 may be traversed along a rotating work piece 258 and moved radially with respect thereto under automatic control for reproducing an undulating contour on the work piece.

It may be found desirable on heavy work to increase the torque on the output shaft of the hydraulic motors and to this end, as shown in Figure 8, the output shaft of the hydraulic motor may be connected by a reduction gearing 259 to the final output clutch member 36.

There has thus been provided novel and improved means for converting a conventional machine tool into a contouring machine whereby irregular contours may be automatically reproduced thereby increasing the usefulness of such machines.

I claim:

1. In a machine tool having a tool support and a work support and rotors for effecting relative movement between the supports in two directions at right angles to each other, the combination of means whereby a pattern mounted on one of said supports may be automatically reproduced by the machine, including a pair of fluid operable motors detachably connectible to said rotors, a portable unit external of the machine for supplying fluid under pressure to said motors including a control valve; a tracer unit attachable to the other of said supports in cooperative relation with the pattern, and remote control connections coupling the tracer for control of the valve in said portable unit.

2. In a machine tool having a tool support and a work support, a metal working tool mounted on said tool support, and rotors for effecting relative movement between said supports in right angular directions, the combination of means for automatically reproducing a pattern with said machine, including a pair of fluid operable motors connectible for power actuation of said rotors, a portable unit for supplying fluid pressure to said motors, including a flow dividing valve; a tracer mountable upon one of said supports in cooperative relation to the pattern carried by the other of said supports for deflection thereby, pressural control channels coupling the tracer for shifting said valve in accordance with the amount of tracer deflection, means coupling one of said motors to the valve for several operations when the tracer is in a predetermined deflected position, and means coupling the other motor to said valve for joint operation with the other motor when the tracer departs from said predetermined deflected position.

3. In a machine tool having a work support and a cutter support, a cutter carried by said support, and individual rotors arranged in planes normal to one another for effecting relative movement between the supports in right angular paths whereby a rectilinear cutting path may be effected in either direction, the combination of means for rendering said cutting path non-rectilinear, including a first fluid operable motor connectible to one of said rotors for feeding along one path, a second fluid operable motor connectible to the other rotor for causing departures from said feeding path and thereby creating a non-rectilinear path, a control valve external of the machine, a source of pressure connected thereto, said valve having a first position for connecting said source of pressure to the first named motor for several operations thereof, and other positions for connecting said source of pressure to both of said motors for joint operation, a tracer unit attachable to one of said supports and having a deflectable tracer, and means operatively connecting said tracer for governing the position of said valve in accordance with the deflection thereof by a pattern.

4. In a machine tool having a work support and a rotatable tool spindle, the combination with a pair of rotors for effecting relative movement between the support and spindle in a first direction transversely to the axis of said tool spindle, and in a second direction parallel to the axis of said tool spindle, of means for rendering the machine adaptable for contouring operations, including a portable unit positionable in proximate relation to the machine and having means for providing fluid under pressure, a pair of hydraulic motors permanently connected hydraulically to said unit, means for operatively connecting said motors to said rotors, a tracer unit attachable to said machine in cooperative relation to a pattern carried by the work support, said tracer unit having a tracer arm deflectable by the pattern, and means in the portable unit remotely controlled by said tracer in accordance with the deflection thereof for governing the distribution of fluid from said unit to said motors.

5. In a machine tool having a tool support and a work support, and rotors for effecting relative movement between the supports in right angular directions, the combination of means for converting the machine into a modeling machine, including a portable unit positionable in proximate relation to the machine, said unit having means for developing fluid under pressure, a pair of fluid operable motors carried by the unit for detachable connection to said rotors, a control valve in said unit, means permanently hydraulically connecting said motors to said control valve, a tracer detachably connectible to the machine in cooperative relation to the pattern, and pressural control connections from the tracer to the valve whereby the tracer may remotely control the distribution of fluid pressure from said unit directly to said motors.

6. In a machine tool having a pair of rotors for effecting relative movement between the work support and tool support of the machine along rectilinear paths, the combination of means for rendering said paths non-rectilinear in accordance with the outline of a pattern, including a portable unit having fluid operable motors detachably connectible to said rotors, means in the unit for supplying fluid under pressure, a valve in the unit for selectively connecting said fluid supply for joint or several operations of said motors, and means forming a part of said unit and detachably connectible to said machine and responsive to departures in said pattern from a rectilinear line for remotely controlling the position of said valve and thereby the proportion of the rates of operation of said motors.

7. In a machine tool having angularly arranged lead screws for effecting relative movement between a tool support and a work support and normally operable to establish a rectilinear cutting path, the combination of means for causing said screws to automatically establish a non-rectilinear cutting path in accordance with the outline of a pattern, including a pair of rotatable hydraulic motors detachably connectible to said screws, a tracer for following the outline of said pattern, means external of the machine for supplying fluid under pressure, and including a control valve for governing the distribution of said fluid to said motors, and hydraulic motion transmitting connections from the tracer to said valve for governing the position of the latter in accordance with movements of the tracer as effected by the pattern.

8. In a machine tool having angularly arranged rotatable lead screws for effecting relative movement between a work support and a tool support in two rectilinear directions, said work support adapted to have a pattern positioned thereon with the general direction of its profile parallel to one of said lead screws, means for rendering the machine tool capable of reproducing said pattern, including a portable unit having a pair of fluid operable motors permanently connected hydraulically to said unit, means in the unit for creating a source of fluid pressure, a control valve having a first position for connecting said source of fluid pressure to the first of said motors and other positions for dividing the flow of pressure fluid among both of said motors, means to detachably connect the first of said motors to the lead screw which is parallel to the general direction of said profile to effect a substantially continuous movement between the tool support and work support, means to detachably connect the remaining motor to the remaining lead screw for causing departures from the general direction of the feeding movement and thereby cause the tool to reproduce the outline of said pattern, and means permanently connecting the tracer hydraulically for remote control of the valve in said unit.

9. In an attachment for rendering rectilinearly cutting machine tools adaptable for profiling purposes, the combination of a portable unit having a pair of rotary hydraulic motors, pumping means carried by the unit for delivering fluid under pressure, a control valve for governing the distribution of said fluid among said motors, said motors being permanently connected hydraulically to said control valve, said connections including flexible channels whereby the motors may be removed from the unit and operatively connected to the lead screws of said machine, a tracer unit including a tracer, means to detachably mount said tracer unit on the machine with the tracer in cooperative relation to a pattern carried thereby, and means operable by the tracer for remotely controlling the position of said control valve.

10. In a portable unit for rendering rectilinearly cutting machine tools adaptable for profiling operations, the combination of a housing having a fluid reservoir therein, pumping means carried by the housing for withdrawing fluid from said reservoir and delivering the same under pressure, a plurality of fluid operable rotatable motors mounted on placement pads carried by the housing, flexible connections permanently connecting said motors to said valve, said flexible connections being of sufficient length to permit removal of said motors from said pads for detachable connection to lead screws of the machine, a tracer head carried by said unit and removable therefrom for attachment to the machine tool in cooperative relation to a pattern, and flexible channels connecting said tracer head to said tracer controlled valve for hydraulically controlling the position thereof in accordance with variations in the pattern, to cause variation in the relative rates of actuation of said motors.

11. In a machine tool having a tool support and a work support and rotors for effecting relative movement between the supports in two directions at right angles to each other, the combination of means whereby a pattern mounted on one of said supports may be automatically reproduced in the machine, including a pair of fluid operable motors detachably connectible to said rotors, a portable unit having means therein for supplying fluid under pressure to said motors, including a control valve shiftable to vary the proportional rates of operation of said motors, a tracer unit detachably mounted on the other of said supports in cooperative relation with the pattern, motion transmitting connections from said tracer unit for shifting said control valve and said motors for stopping relative movement between the supports.

12. In a machine tool having a tool support and a work support and rotors for effecting relative movement between the supports in two directions at right angles to each other, said rotors terminating in clutch portions, the combination of means whereby a pattern mounted on one of said supports may be automatically reproduced by the machine, including a pair of rotatable fluid operable motors, said motors terminating in clutch portions for detachable connection to said rotors, a portable unit having a fluid reservoir and a pump for delivering said fluid under pressure to said motors, a valve for controlling the distribution of fluid to said motors, a tracer unit adapted to be mounted on the machine in cooperative relation with the pattern, and remote control connections coupling the tracer unit for control of said valve.

13. In a machine tool having a tool support and a work support and rotors for effecting relative movement between the supports in two right angular directions, the combination of means whereby a pattern mounted on one of said supports may be automatically reproduced by the machine, including a pair of fluid operable motors detachably connectible to the respective rotors, a portable unit having a fluid reservoir, a pump for delivering fluid from said reservoir under pressure to said motors, including a control valve shiftable to determine the rate of unidirectional actuation of one of said motors and the rate of reversible actuation of the other of said motors, a tracer unit adapted to be mounted on the machine with its tracer in cooperative relation with the pattern, motion transmitting connections coupling the tracer for variably shifting said valve, and additional valve means associated with each motor for control thereof.

14. In a machine tool having a tool support and a work support and rotors for effecting relative movement between the supports in right angular directions, the combination of means whereby a pattern mounted on one of said supports may be automatically reproduced in the machine, including a fluid operable "feed" motor, a fluid operable "profiling" motor, said motors terminating in clutch portions for detachable connection to said rotors, a portable unit having means for supplying fluid under pressure for actuation of said motors, including a control valve, means connecting the "feed" motor to said valve in a manner for determining unidirectional actuation thereof, means connecting the "profiling" motor to said valve in a manner for controlling reversible actuation thereof, and a tracer unit mounted on the machine and having remote control connections for determining the position of said valve.

15. In a machine tool having a tool support and a work support and rotors for effecting relative movement between the supports in two angularly related directions, the combination of means whereby a pattern mounted on one of said supports may be automatically reproduced in the machine, including a "feed" motor and a "profiling" motor, said motors having means for detachable connection to either of said rotors, a portable unit for supplying fluid under pressure to said motors, including a flow dividing valve, said valve having portions for determining reversible actuation of said "profiling" motor, a tracer unit adapted to be detachably mounted on the machine with its tracer in cooperative relation with the pattern and having remote control connections for governing the position of said control valve, and means associated with the "feed" motor for reversing its direction of actuation.

16. In a machine tool having a tool support and a work support, a metal working tool mounted in said tool support, and rotors for effecting relative movement between said supports in right angular directions, the combination of means for reproducing a pattern in said machine, including a pair of fluid operable motors detachably connectible for power actuation of said rotors, a portable unit for supplying fluid under pressure to said motors, including a flow dividing valve, a tracer adapted to be detachably mounted upon one of said supports in cooperative relation with a pattern carried by the other of said supports, pressural control channels coupling the tracer for shifting of said valve in accordance with the amount of tracer deflection, means coupling the motors to said valve for joint or several uni-directional actuation of one of said motors and joint reversible actuation of the other of said motors.

17. In a machine tool having a tool support and a work support, and rotors for effecting a relative movement between the supports at right angles to each other, the combination of means whereby a pattern mounted on one of said supports with the general plane of its profile lying parallel to one of said rotors may be automatically reproduced, including a "feed" motor and a "profile" motor, said motors terminating in clutch portions whereby the "feed" motor may be detachably connected to said one rotor and the other to the remaining rotor, a remote control valve external of the machine for governing uni-directional actuation of said "feed" motor and reversible actuation of said "profiling" motor, and a tracer adapted to be mounted on the machine in cooperative relation to said pattern, and remote control motion transmitting connections coupling the tracer for governing actuation of said control valve.

18. A portable attachment for converting machine tools having a plurality of lead screws for effecting three-directional movements between a work support and a cutter support for utilization in die-sinking operations, comprising a control unit having a reservoir of fluid medium, a pair of hydraulic motors permanently connected by flexible channels to said unit, said motors having means for detachable connection to two of said lead screws of the machine for determining universal movement in one plane between the work support and cutter support, a control valve in the unit, means for delivering said fluid medium under pressure to the control valve, means in the control valve for governing the distribution of said medium among said motors, a tracer having flexible channel connections to said control valve for remotely controlling the position thereof, and a fluid operable "index" motor having means for detachable connection to the remaining lead screw for shifting the cutting plane relative to the work.

19. An attachment for converting a knee and column type milling machine for die-sinking purposes, comprising a portable unit having a reservoir of fluid medium therein, a tracer controlled flow dividing valve, a pump for delivering said fluid medium from the reservoir to said valve under pressure, a plurality of hydraulic motors having permanent flexible fluid connections to said valve, means on said motors for detachable operative connection selectively to the lead screws of the saddle, table and knee of said machine, and a tracer having flexible fluid connections for pressurally controlling the position of the flow dividing valve, said tracer being attachable to the machine in a parallel relation to the axis of said cutter.

20. Means for rendering a knee and column type milling machine utilizable for the performance of die-sinking operations, comprising a pair of fluid rotatable motors having means for detachable connection to the table and saddle respectively of said machine, a portable control unit having means for supplying fluid medium under pressure, a control valve for distributing said medium to the motors, permanent flexible channel connections connecting the motors to said control valve whereby universal movement in one plane between the cutting tool of the machine and the work table may be effected, said unit having a tracer head and a valve therein for hydraulically controlling the position of said control valve, flexible channels connecting the tracer head to said unit whereby the tracer head may be remotely positioned with respect to said unit on a fixed part of the machine in parallel relation to the axis of the cutter, a fluid operable "index" motor having means for detachable connection to the operating screw for the knee, flexible channels connecting said "index" motor to the channels of the motor that effects the feeding movement, whereby each time the "feeding" motor is reversed a relative indexing movement between the tool and work will be effected.

21. Means for rendering a knee and column type milling machine utilizable for die-sinking purposes, comprising a portable unit having a reservoir of fluid medium therein, a pair of fluid rotatable motors, one of said motors having means for detachable connection to the table of said machine, the other of said motors having means for detachable connection selectively to the operating screw of either the saddle or the knee of said machine, an index motor selectively connectible to the remaining operating screw, a control valve for determining proportional rates of operation of said first two motors, a pump for delivering fluid from said reservoir to said valve under pressure, flexible channel connections coupling said motors to the control valves, a tracer adapted to be detachably mounted on the machine, including remote control connections for governing the position of said control valve, means for reversing one of said first two named motors to change the direction of feed, and means to simultaneously cause actuation of said "index" motor each time the other motor is reversed.

22. Means for rendering a knee and column type milling machine utilizable for die-sinking purposes, comprising a portable unit having a reservoir of fluid medium therein, a tracer controlled flow dividing valve, a tracer head detachably mountable on the machine, including a tracer, means responsive to deflection thereof for governing the position of said flow dividing valve, a pair of rotatable hydraulic motors connected by flexible channels to said flow dividing valve, said motors having terminal clutch portions, whereby one of them may be detachably connected to the saddle lead screw of the machine, and the other connected selectively to the table or the knee, an index motor detachably connectible to the remaining slide, and means whereby when one of said motors is reversed the "index" motor will be actuated.

23. In a machine tool having a work support and a tool support, and three lead screws for effecting relative movement therebetween in three directions normal to one another, the combination of a first rotatable hydraulic motor detachably connectible to one of said lead screws for effecting relative movement between said supports in one direction, a second hydraulic rotatable motor detachably connectible to a second of said lead screws for effecting relative movement between the supports in a second direction, a fluid operable index motor detachably connectible to the remaining lead screw for effecting relative movement between the supports in a third direction, a portable unit, including means for determining the distribution of fluid pressure among said first two motors, a tracer contactable with a pattern carried by one of said supports, means associated with one of said first named motors for reversing the direction of rotation thereof, said means also being operable to cause actuation of said index motor each time the direction of rotation of the controlling motor is changed.

24. In a machine tool having a reciprocable work support and a cutter spindle supported for rotation about an axis parallel to the direction of movement of the work support, the combination with a first lead screw for reciprocating said work support, and a second lead screw for effecting lateral adjustment of the work support, of a portable unit, including a pair of rotatable hydraulic motors having terminal driving portions for detachable engagement with portions on the ends of said lead screws, a tracer head having a tracer supported therein for universal movement, means to support the tracer head in the machine with the axis of the tracer in coincidence with the axis of the tool spindle, pressure fluid supply means in said unit, a valve for controlling the distribution of pressure fluid to said motors, and motion transmitting connections coupling the tracer for control of the position of said valve.

25. In a machine tool having a reciprocable work support and a tool spindle supported for rotation about an axis parallel to the direction of movement of said support, the combination with angularly related lead screws for effecting two-directional movement of said support, including a rotary hydraulic "feed" motor, a rotary hydraulic "profiling" motor, means on said motors for detachable connection to the respective lead screws for actuation thereof, a portable unit for supplying fluid under pressure to said motors, including a flow dividing valve, a tracer unit adapted to be detachably mounted on the machine with its tracer in coincidence with the axis of said cutter spindle but pointing in an opposite direction therefrom, whereby patterns in intaglio may be produced in relief or vice versa, and remote control connections coupling the tracer for governing the position of said control valve.

26. In a machine tool having a tool support and a work support, and rotors for effecting relative movement between the supports in two angularly related directions, the combination of means whereby a pattern mounted on one of said supports may be automatically reproduced in the machine, including a "feed" motor and a "profiling" motor, said motors having means for detachable connection to the respective rotors for actuation thereby, a portable unit for supplying fluid under pressure to said motors, including a flow dividing valve, said valve having portions for determining different rates of uni-directional actuation of said "feed" motor, and additional portions for determining different rates of reversible actuation of said "profiling" motor, an additional control valve interposed between said flow dividing valve and said motors for reversing the coupling of said motors to said respective portions, whereby said "feed" motor is reversibly actuated, a tracer unit adapted to be detachably mounted on the machine with its tracer in cooperative relation with a pattern, and pressural control connections coupling the tracer unit for governing the position of said flow dividing valve.

27. A portable attachment for rendering machine tools having a pair of angularly related lead screws for effecting relative movement between work support and tool support adaptable for performance of contouring operations, comprising a portable unit having self-contained means for supplying fluid under pressure, a pair of rotary hydraulic motors detachably connectible to said lead screws, a first control valve having means for determining uni-directional actuation of one of said motors and reversible actuation of the other motor, a tracer head adapted to be detachably mounted upon the machine in cooperative relation to a pattern carried by one of said supports, hydraulic means controlled by the tracer for governing the position of said control valve, an additional control valve interposed between the motors and their control valve for stopping and starting their actuation, said additional valve having a third position for reversibly connecting said motors to the respective portions of the first named control valve.

28. A portable attachment for rendering machine tools having a pair of angularly related lead screws for effecting relative movement between work support and tool support adaptable for performance of contouring operations, comprising a portable unit having self-contained means for supplying fluid under pressure, a pair of rotary hydraulic motors detachably connectible to said lead screws, a first control valve having means for determining uni-directional actuation of one of said motors and reversible actuation of the other motor, a tracer head adapted to be detachably mounted upon the machine in cooperative relation to a pattern carried by one of said supports, hydraulic means controlled by the tracer for governing the position of said control valve, an additional control valve interposed between the motors and their control valve for stopping and starting their actuation, said valve having a third position for reversibly connecting said motors to the respective portions of the first named control valve, and means to shift said interposed valve, including a control lever, means to limit the movement of the lever through the stop position, said means being removable to permit shifting of the valve to a third position.

29. In a tracer controlled circuit, the combination of a secondary valve, pressural control means for shifting the secondary valve, a tracer controlled valve, a manual controlled valve means to selectively couple either of the last two-named valves for varying the pressure of said pressural control means to govern the position of the secondary valve.

30. The combination with an operating circuit for governing variable actuation of a hydraulic motor including a control valve, of a tracer controlled valve, a manual controlled valve, and means to selectively couple either of the last two-named valves for governing hydraulic actuation of said control valve.

31. In a machine tool having work and cutter supports, the combination of hydraulic actuating means detachably connectible for causing relative movement between said supports, a source of pressure fluid supply and a tracer head detachably connectible to the machine and having a tracer engageable with a pattern for governing the supply of fluid pressure to said hydraulic actuating means in accordance with variations in a pattern.

32. In a machine tool having screw actuated tool and work supports including manual actuators for the screws, the combination of portable hydraulic motors substitutable for said actuators, a tracer head detachably connectible to one of said supports, a power control unit for said motors, and means coupling the tracer for governing said power control unit in accordance with variations in a pattern for causing relative movements between said supports along a path corresponding to the outline of the pattern.

LEIGH W. WRIGHT.